United States Patent [19]

Inoue

[11] Patent Number: 5,420,426
[45] Date of Patent: May 30, 1995

[54] PYROELECTRIC DEVICE

[75] Inventor: Masao Inoue, Tokyo, Japan

[73] Assignee: Nohmi Boasai Ltd., Tokyo, Japan

[21] Appl. No.: 66,146

[22] PCT Filed: Sep. 24, 1992

[86] PCT No.: PCT/JP92/01211

§ 371 Date: May 21, 1993

§ 102(e) Date: May 21, 1993

[87] PCT Pub. No.: WO93/06444

PCT Pub. Date: Jan. 4, 1993

[30] Foreign Application Priority Data

| Sep. 24, 1991 | [JP] | Japan | 3-315555 |
| Nov. 14, 1991 | [JP] | Japan | 3-93493 |
| Nov. 14, 1991 | [JP] | Japan | 3-93494 |
| Feb. 17, 1992 | [JP] | Japan | 4-6210 |
| Apr. 10, 1992 | [JP] | Japan | 4-134101 |

[51] Int. Cl.⁶ .................. G01J 5/02; H01L 31/0224
[52] U.S. Cl. ......................................... 250/338.3
[58] Field of Search .............................. 250/338.3

[56] References Cited

FOREIGN PATENT DOCUMENTS

| 0145457 | 6/1985 | European Pat. Off. . | |
| 0224595 | 6/1987 | European Pat. Off. . | |
| 0398725 | 11/1990 | European Pat. Off. . | |
| 0417846 | 3/1991 | European Pat. Off. . | |
| 55-34291 | 3/1980 | Japan . | |
| 59-87327 | 5/1984 | Japan . | |
| 61-170626 | 8/1986 | Japan . | |
| 63-315925 | 12/1988 | Japan | 250/338.3 |
| 1-111299 | 4/1989 | Japan | 250/338.3 |
| 2-72943 | 6/1990 | Japan . | |
| 2061616 | 5/1981 | United Kingdom . | |
| 2197753 | 5/1988 | United Kingdom | 250/338.3 |

OTHER PUBLICATIONS

Patent Abstracts of Japan, vol. 5, No. 30 (E-47) Feb. 24, 1981.
Patent Abstracts of Japan, vol. 8, No. 101 (P-273)(1538) May 12, 1984.
Patent Abstracts of Japan, vol. 7, No. 196(P-219)(1341) Aug. 26, 1983.

*Primary Examiner*—Constantine Hannaher
*Attorney, Agent, or Firm*—Wenderoth, Lind & Ponack

[57] ABSTRACT

A pyroelectric device is arranged such that a pyroelectric member sensitive to infrared rays is incorporated in a casing composed of a can and a stem made of materials with similar thermal expansion coefficients. A filter for sealing a window hole for introducing infrared rays into the inside of the pyroelectric device is fixed to the window hole by a fusing agent of silver solder. Electrodes are formed on the upper and lower surfaces of the pyroelectric member and are composed of an absorbing electrode portion for absorbing infrared rays and a drawing electrode portion for outputting an electric signal by sensing the infrared rays. The absorbing electrode portion is composed of an infrared ray absorbing material formed in a thin layer. The drawing electrode portion is composed of the same material formed in a layer thicker than that of the absorbing electrode portion. Terminal pins passing through the pyroelectric device for outputting the electric signal are provided with flat collars near the extreme ends of the terminal pins. A printed board for internally processing the electric signals is abutted against the flat collars so that it is stably supported on the terminal pins in parallel with the filter.

4 Claims, 7 Drawing Sheets

PYROELECTRIC DEVICE

BACKGROUND OF THE INVENTION

The present invention relates to a pyroelectric device used as an infrared-ray sensor and heat sensitive device.

A pyroelectric device can be used as an infrared-ray sensor using a pyroelectric element composed of a material such as, for example, PVDF (polyvinylidene fluoride), PZT (lead zirconate titanate) or the like, or can be used as a sensing device such as a flame sensor disposed in a tunnel or the like to detect infrared rays of flame when fire is caused, or can be used as an intrusion detector used in a security system for detecting infrared rays from a human body.

Conventionally, as shown in FIG. 6, a pyroelectric device is arranged such that a pyroelectric member 40 and a printed board 41 are disposed on a base comprising stem 42 composed of metal or the like, and are sealed by a frame member comprising a can 43 composed of a steel plate or the like covering the upper periphery of the stem 42. The printed board 41 includes circuit elements 61 such as a field effect transistor (FET) or the like mounted thereon to output the intensity of infrared rays detected by the pyroelectric member 40 in the form of an electric signal. More specifically, the can 43 is provided with a light transmitting window hole 44 through the ceiling thereof so that unillustrated infrared rays emitted from the flame of, for example, a fire or the like are irradiated to the pyroelectric member 40 through the window hole 44. A filter 45 composed of, for example, silicon which is excellent in infrared ray transmittance is disposed over the window hole 44 to seal the same and enable the infrared rays to be transmitted therethrough. The sealing by and the bonding of the filter 45 is performed by forming an adhesive-bonding portion 46 with an adhesive such as an epoxy resin or the like.

Although the casing of the pyroelectric device is composed of the can 43 and stem 42 as described above, the sealed type pyroelectric device is formed in such a manner that the can 43 and stem 42 are fused or adhesive-bonded to each other at the sealing portion 47 along the periphery of the stem. As shown in FIG. 6, three lead terminals, that is, a ground terminal. 48, a source terminal 49 and a drain terminal 50 extend from the stem 42 and the aforesaid electric signal is output to an unillustrated main electric circuit through these lead terminals. In this case, although the ground terminal 48 is directly connected to the stem 42, the two other terminals, that is, the source terminal 49 and drain terminal 50 are fixed to the stem 42 in a sealed state through insulating members 51 so as to be insulated from the stem 42.

Arrangement of the pyroelectric member 40 will be described in detail with reference to the enlarged cross sectional view shown in FIG. 7. The pyroelectric member 40 is disposed on the printed board 41 through a base member 58, and keyhole-shaped electrodes 52 and 53 each composed of a protecting rectangular portion and a disc-shaped portion are formed respectively on the upper and lower surfaces of the pyroelectric member 40 by vapor deposition or the like. The disc-shaped portions 54 and 55 of these electrodes are disposed to confront to each other across the pyroelectric member 40, and the projecting portions 56 and 57 thereof are disposed so as to extend from the disc-shaped portions 54 and 55 to the right and left sides of the pyroelectric member 40, respectively. The electrodes 52 and 53 are composed of an infrared ray absorbing material such as nickel chromium alloy, gold black or the like.

The pyroelectric member 40, base member 58 and printed board 41 are bonded and fixed to each other through a suitable material, respectively, and electrically conductive adhesives 59 and 60 are applied between the electrodes 52 and 53 on the upper and lower surfaces of the pyroelectric member 40 and unillustrated circuit patterns of the printed board 41 so that electric conductivity is established therebetween. An electrically conductive adhesive mixed with silver filler or the like is used as the electrically conductive adhesives 59 and 60.

When the aforesaid pyroelectric device is used as, for example, a flame sensor, it is required to operate normally as well as safely and securely in environments having a wide range of humidities, having corrosive gases and having a wide range of temperatures. This is because pyroelectric devices are used in severe environmental conditions in the indoors and outdoors such as, for example, in a factory, parking area, hot-spring resort, tunnel or the like. When an accelerated operation test is executed in correction with the conventional pyroelectric device arranged as described above to confirm its operation to satisfy the above requirements, since the can 43 is composed of a steel plate and the filter is composed of silicon, a problem arises in that the surface of the can 43 rusts and further the occurrence of the rust is naturally accelerated under the existence of the corrosive gases. In addition, a gap is formed in the adhesive-bonding portion 46 adjacent to the window hole 44 and the filter 45 cracks due, to the difference in thermal expansion coefficients thereof.

Further, the pyroelectric device includes the filter 45 fixed over the window hole 44 of the can 43 by the resin adhesive-bonding portion 46. Since the bonding portion 46 is composed of the resin, a gap is liable to be formed due to the ventilating property and deterioration of the resin, although this is dependent on the characteristics of the resin, and thus the functional life of the bonding portion 46 in providing an airtight seal is very short. That is, a problem arises in that moisture contained in the outside air or corrosive gases penetrates through the bonding portion 46 and corrodes the pyroelectric member 40 and circuit elements 61 to lower the reliability of the pyroelectric device.

Further, in this type of pyroelectric device, the electrodes 52 and 53 formed on the surfaces of the pyroelectric member 40 have a function of electrically connecting to the pyroelectric member 40 as well as the another function of containing infrared rays incident on the pyroelectric member 40. More Specifically, it is ideal that the electrode 52, as a light receiving surface, absorbs the infrared rays without reflecting the same and the electrode 53 on the backside thereof reflects the infrared rays without causing the same to be transmitted therethrough so as to improve the infrared racy absorbing efficiency to the pyroelectric member 40. Therefore, the electrodes 52 and 53 are individually formed to a predetermined optimum thickness.

The electrically conductive adhesives 59 and 60 are applied to the electrodes 52 and 53, respectively, and when the adhesives are cured, a tension is applied to the electrodes 52 and 53. Since the electrodes 52 and 53 are formed thin for the purpose of absorbing infrared rays, and thus when the thin and slender electrodes 52 and 53 are subjected to corrosion, vibration or the like, they may be easily cut off at the boundary between them and the adhesives 59 and 60. In particular, when the pyroelectric device is used as a flame sensor for detecting infrared rays, severe regulations regarding durability are applicable to the pyroelectric device, and it may be installed at a place with very bad environmental conditions under which the pyroelectric device is damaged.

SUMMARY OF THE INVENTION

Therefore, an object of the present invention is to electrically connect electrodes to circuit patterns of a printed board securely without reducing the infrared ray absorbing efficiency of a pyroelectric element.

Another object of the present invention is to provide a pyroelectric device capable of maintaining a sufficient airtightness and having a casing that maintains a weather resistance, even if the environmental conditions such as temperature and the like change severely, without damaging a filter mounted to a window portion of the casing.

A further object of the present invention is to improve an airtightness when a window hole of a can is sealed with a filter and also to increase the strength thereof.

A still further object of the present invention is to improve the parallel orientation of a printed board to a stem when the printed board is mounted on the stem, so as to provide a pyroelectric device which has excellent mechanical properties and performance and also is easy to work with.

To achieve these objects, according to the present invention, there is provided a pyroelectric device, which comprises a stem having a pyroelectric member including electrodes formed on the upper and lower surfaces thereof for detecting infrared rays and a printed board mounted thereon, the printed board having an electric circuit for outputting the infrared rays detected by the pyroelectric member as an electric signal, a can having a window hole and fixed to the stem in an airtight state, and a filter for sealing the window hole. Each of the electrodes formed on the upper and lower surfaces of the pyroelectric member includes an absorbing electrode portion for absorbing infrared rays and a outputting electrode portion for drawing an electric signal to an electrically conductive adhesive, the absorbing electrode portion being composed of an infrared ray absorbing material formed as a thin layer, the drawing electrode portion being composed of the same material formed as a layer thicker than that of the absorbing electrode portion or composed of a corrosion resistive material.

The can having the window hole for the filter and the stem which cooperatively form a casing are composed of an alloy having the constitution of Fe; 55%, Ni: 28% and Co: 17%. When the window hole is sealed by the filter, the filter is abutted against the circumference of the window hole through a fusing agent and the fusing agent is melted and then solidified to fix the filter to the window hole so that the inside of the pyroelectric device is placed in a sealed state. Terminal pins stand on the stem in communication with the outside and inside of the pyroelectric device to support the printed board and take output the electric signal from the electric circuit of the printed board. The terminal pins have collars radially projecting at the extreme ends thereof on the inner side of the pyroelectric device, whereby When the extreme ends are inserted into the pin holes formed in the printed board, the collars are abutted against the printed board to support the same parallel to the stem.

DETAILED DESCRIPTION OF THE INVENTION

Figure 1:
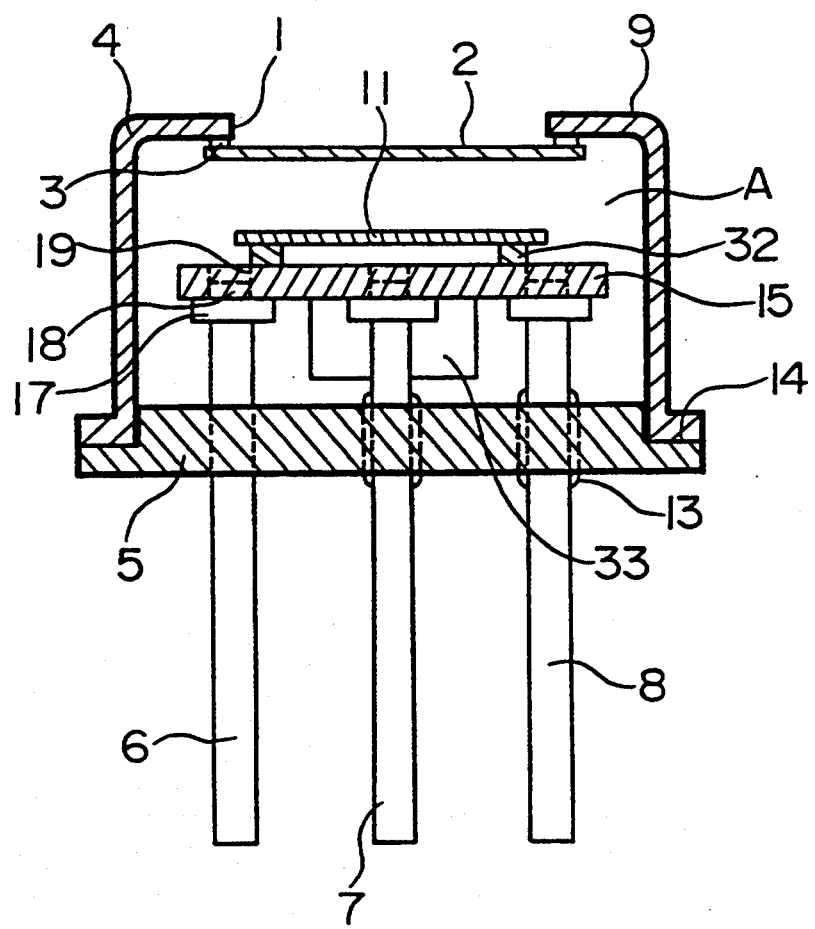
FIG. 1 is a longitudinal cross sectional view showing an embodiment of a pyroelectric device according to the present invention.

The arrangement of an embodiment of the present invention will now be described with reference to the drawings. In FIG. 1, a pyroelectric device includes a main body casing composed of a can 4 and a stem 5 both of which are formed of Kovar, the can 4 having a window hole 1 and a filter 2 composed of a silicon plate (or laminated interference filters) and fused and fixed to the window hole 1 by a fusing agent 3 of silver solder. A gold electrolytic plating is applied to the can 4 and the stem 5 arranged as described above to form a surface treatment film 9. Three lead terminals, that is, a ground terminal 6, a source terminal 7 and a drain terminal 8 are attached to the stem 5 and connected to a main electric circuit of, for example, an unillustrated flame sensor or the like. In this case, although the ground terminal 6 is directly and in contact with the stem 5, the other two terminals are fixed to the stem 5 in a sealed state through insulating members 13 so as to be insulated from the stem 5.

Since Kovar (Fe:Ni:Co=55:28:17) has a thermal expansion coefficient $\alpha=4.7\times10^{-6}/°C$. while silicon used for the filter 2 has a thermal expansion coefficient $\alpha=2.4\times10^{-6}/°C$., the difference of the thermal expansion coefficients is small. Therefore, when the can 4 is formed of Kovar, no mechanical trouble due to the difference of the thermal expansion coefficients occurs at a junction portion. Since a steel plate used for a can in the prior art has a thermal expansion coefficient $\alpha=13.2\times10^{-6}/°C$., the employment of the Kovar is very useful as compared with the steel plate. Further, when sapphire is used for the filter 2, since the sapphire has a thermal expansion coefficient $\alpha=5.3\times10^{-6}/°C$., a difference of the thermal expansion coefficients can be further reduced so that trouble due to the difference of the thermal expansion coefficients can be likewise prevented in the same way.

Further, when the stem 5 is also composed of Kovar, since the can 4 and the stem 5 have the same thermal expansion coefficient, trouble at the sealing portion 14 such as a mechanical strain or damage can be avoided. That is, the sealing portion 14 is entirely free from trouble due to the difference of thermal expansion coefficients regardless of whether it is fused, adhesive-bonded or caulked. The sealing portion 14 of the present embodiment is sealed and joined by electric spot welding making use of resistance heating, and in this case a gold-plated treatment film existing there causes a disadvantage, and thus the treatment film 9 is not provided with the sealing portion 14. When the treatment film 9 is nonelectrolytically plated with nickel, it need not be omitted from the sealing portion 14.

When the stem 5 is composed of Kovar as described above and the three terminals 6, 7 and 8 are also composed of Kovar, these terminals can be advantageously sealed by using glass as the insulating members 13. In this case, the three Kovar terminals 6, 7 and 8 are also subjected to a surface treatment. The can 4 is joined to the stem 5 at the sealing portion 14 to integrally form the casing. Although the gold plating is shown as the corrosion-resistant surface treatment film 9 in the above embodiment, a film coated with an organic polymer such as a polytetrafluoroethylene resin may be used.

A process for joining the filter 2 to the can 4 is such that the fusing agent 3 composed of silver solder is disposed about the circumference of the window hole 1 of the can 4 and the filter 2 is placed thereon. Then, the fusing agent 3 is heated to be melted under a reducing atmosphere excluding oxygen and thereafter cooled. Thus, the fusing agent 3 is caused to fit the circumference of the window hole 1 of the can 4 and the outer periphery of the filter 2 so that the filter 2 can be fixed in a perfectly sealed state.

This joint made by the fusing is advantageous with regard to the sealing property and strength as compared with the joint made by a resin adhesive, and the penetration of the air from outside into the inside A of the frame member can be completely shut off. The material used for the fusing agent may be, for example, fusing glass in addition to the silver solder.

When this process is executed in an atmosphere under a vacuum state, the inside A of the frame member can be placed in a vacuum state, and thus the effects of humidity and the like in the remaining gas on the various functional elements in the inside A of the frame member can be prevented. A conventional resin adhesive cannot keep the inside A of the frame member in the vacuum state because of the insufficient strength thereof. The vacuum state in the inside A of the frame member may be established by forming a pin hole through the stem 5, absorbing a gas therethrough, and thereafter sealing the pin hole. Further, the remaining gas may also be removed by replacing the gas in the inside A of the frame member with an inert gas such as a nitrogen gas of high purity.

Further, when the inside A of the frame member is placed in the vacuum state, the performance of the device itself can be improved. More specifically, a pyroelectric member 11 as a member for detecting infrared rays changes its electric characteristics as heat of the infrared rays is absorbed and usually the absorbed infrared rays are partially radiated in some forms. Thus, when the inside A of the frame member is kept in the vacuum state, no thermal convection is generated in the inside and thus a thermal radiation due to a gas flow can be prevented. Therefore, a sensitivity and response speed of the pyroelectric device can be improved and at the same time an external noise can be reduced.

Various functional elements such as the pyroelectric member 11, a circuit element 33 such as an FET or the like are assembled in the casing to carry out the function of a pyroelectric device. The terminal pins including the ground terminal 6, the source terminal 7 and the drain terminal 8, which support the printed board 15 thereon and are connected to wires for outputting an electric signal from the pyroelectric member 11, are provided with flat collars 17 disposed in the extreme end regions of the respective pins on the inner side Of the casing and arranged as the terminal pins with the collars (hereinafter, referred to as kneel pins). When the collar 17 is provided for each pin, an extreme end portion 18 projects from the collar 17. Each extreme end portion 18 is inserted into a pin hole 19 which is formed in the printed board 15 and is fixed thereto by soldering or the like. At this time, the printed board 15 is fixed by being abutted against the upper surfaces of the collars 17. The placement of the printed board 15 on the collars 17 of the three terminal pins enables the pyroelectric member 11 to be disposed in parallel with the plane of the filter and the like in the casing together with the printed board 15. More specifically, an advantage can be obtained in that a pyroelectric device with high accuracy can be effectively manufactured by this arrangement.

Figure 2:
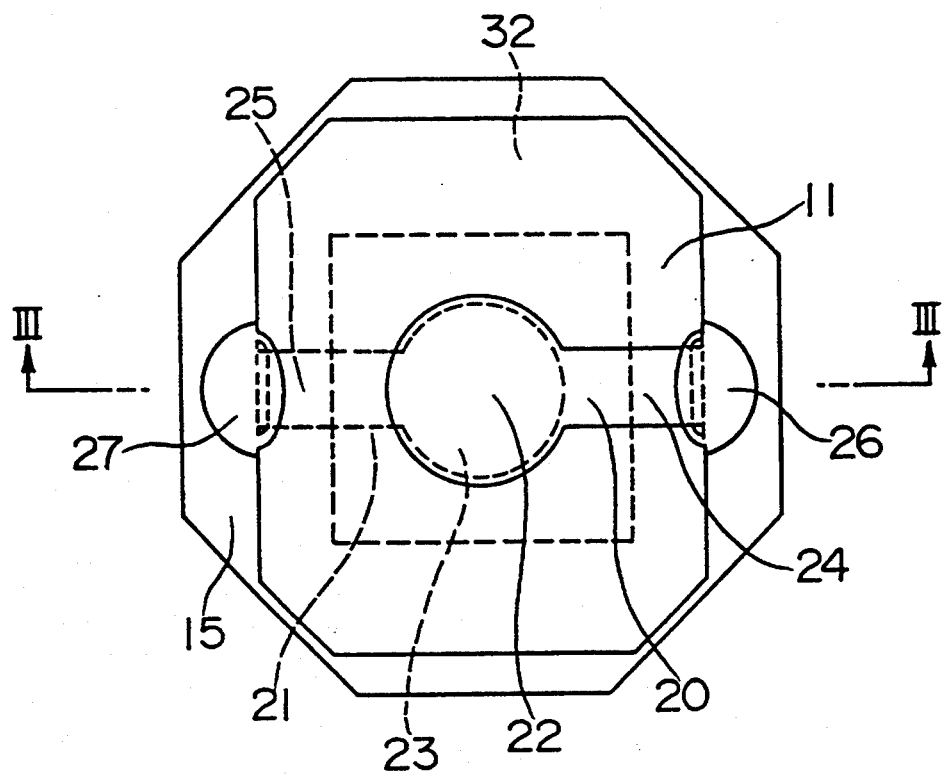
FIG. 2 is a plan view showing a main internal portion of FIG. 1.
Figure 3:
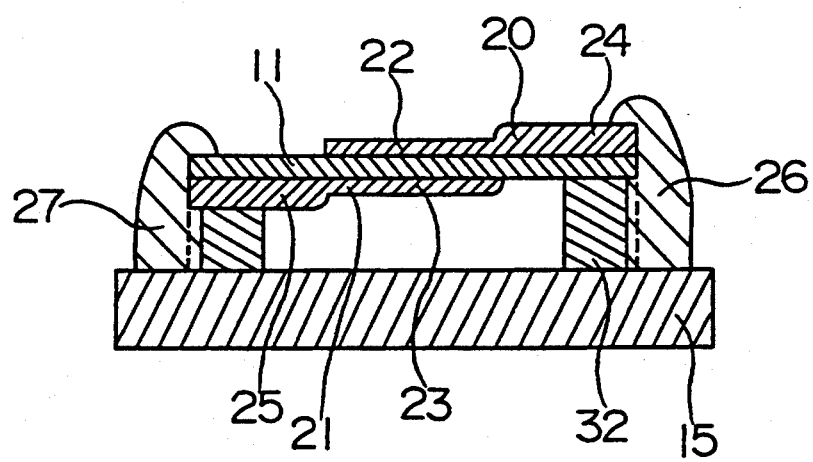
FIG. 3 is a schematic longitudinal cross sectional view of FIG. 2.

The pyroelectric member 11 of the present invention will be described in more detail with reference to FIGS. 2 and 3. The keyhole-shaped electrodes 20 and 21 formed on the upper and lower surfaces of the pyroelectric member 11 include disc-shaped absorbing electrode portions 22 and 23 disposed to confront each other across the pyroelectric member 11, respectively, as well as projecting electrode portions 24 and 25 projecting respectively in the opposite directions from the absorbing electrode portions 22 and 23. The ends of the drawing electrode portions 24 and 25 on the opposite sides of the absorbing electrodes are electrically connected to unillustrated circuit patterns of the printed board 15, which is located below the electrodes 20 and 21 through an element base 32, by electrically conductive adhesives 26 and 27.

When the electrode 20 is manufactured, first, a keyhole-shaped thin layer of a predetermined thickness is formed on one side of the pyroelectric member 11 by vapor deposition or the like. Thereafter, a layer is further laminated only on the portion projecting from the disc-shaped portion of the keyhole shape, in the same way. Thus, the absorbing electrode portion 22 having a layer of a predetermined thickness is formed on the disc-shaped portion and the drawing electrode 24 having a layer thicker than that of the absorbing electrode 22 is formed on the projecting portion. The electrode 21 is formed in the same way as the electrode 20 so that the projecting portion of the drawing electrode portion 25 projects in the direction opposite to that of the drawing electrode portion 24. As a result, since the drawing electrode portions 24 and 25 formed with a narrow width have a thicker layer, the electric conductivity and durability of these electrode portions are improved. The method of manufacturing the electrodes 20 and 21 is not limited to the above mentioned method. Rather, a certain thickness of a layer may be previously formed on each of the drawing electrode portions 24 and 25 and the absorbing electrode portions 22 and 23 may be formed thereon so that they have a predetermined thickness. Further, as another method, the absorbing electrode portions and the drawing electrode portions may be individually formed so that the former electrode portions have a thicker layer than the latter electrode portions.

Figure 4:
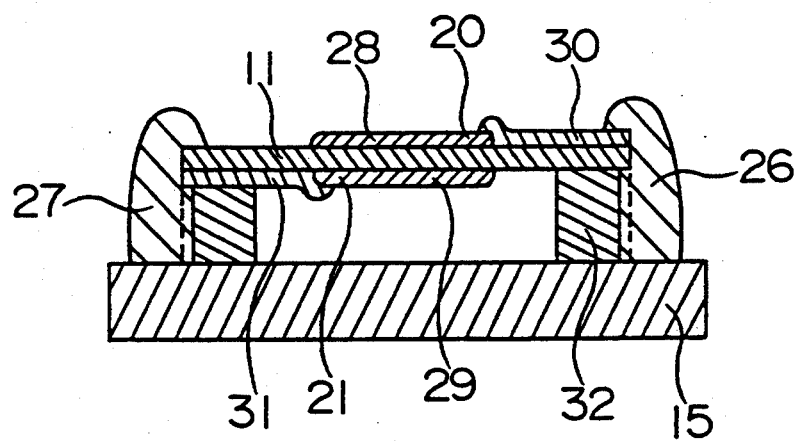
FIG. 4 is a longitudinal cross sectional view showing another embodiment in the same way as FIG. 3.

Another embodiment of the electrodes 20 and 21 will be described with reference to FIG. 4. Although the arrangement of these electrodes and the method of making the same are substantially the same as those of the aforesaid electrodes, they differ in that the material of the absorbing electrode portions is different from that of the drawing electrode portions. More specifically, in the first layer formation executed by vapor deposition or the like, only the disc-shaped portions of keyhole-shapes are formed as the absorbing electrode portions 28 and 29 by using an infrared ray absorbing material such as nickel chromium alloy or the like. Then, when layers are laminated for drawing electrode portions 30 and 31, a good conducting material such as platinum or other corrosion resistive material is used to form projecting portions so that the end portions of the drawing electrode portions 30 and 31 are overlaid with the absorbing electrode portions 28 and 29. With this arrangement, the absorbing electrode portions 28 and 29 as the disc-shaped portions of the electrodes 20 and 21 are composed of the nickel chromium alloy while the projecting portions of the drawing electrode portions 30 and 31 are composed of platinum, and electric conductive adhesives 26 ad 27 are applied to the portion of the platinum. As a result, the electrically conductivity and durability of the drawing electrode portions 30 and 31 are improved in the same way as with the electrodes shown in FIGS. 2 and 3.

Figure 5:
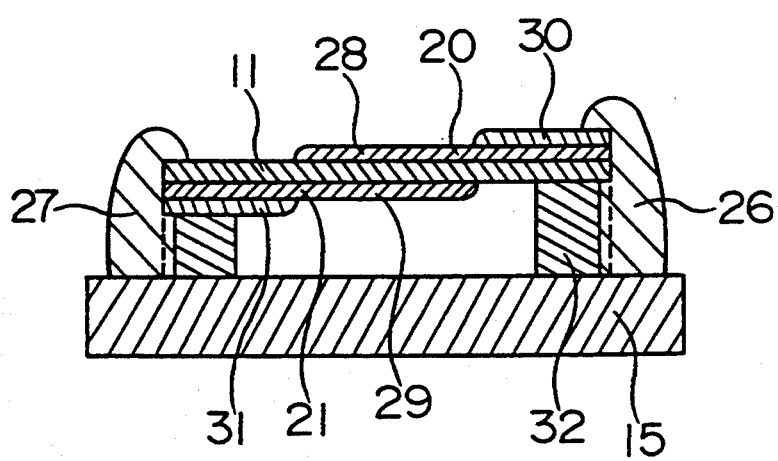
FIG. 5 is a longitudinal cross sectional view showing a further embodiment in the same way as FIG. 3.
Figure 6:
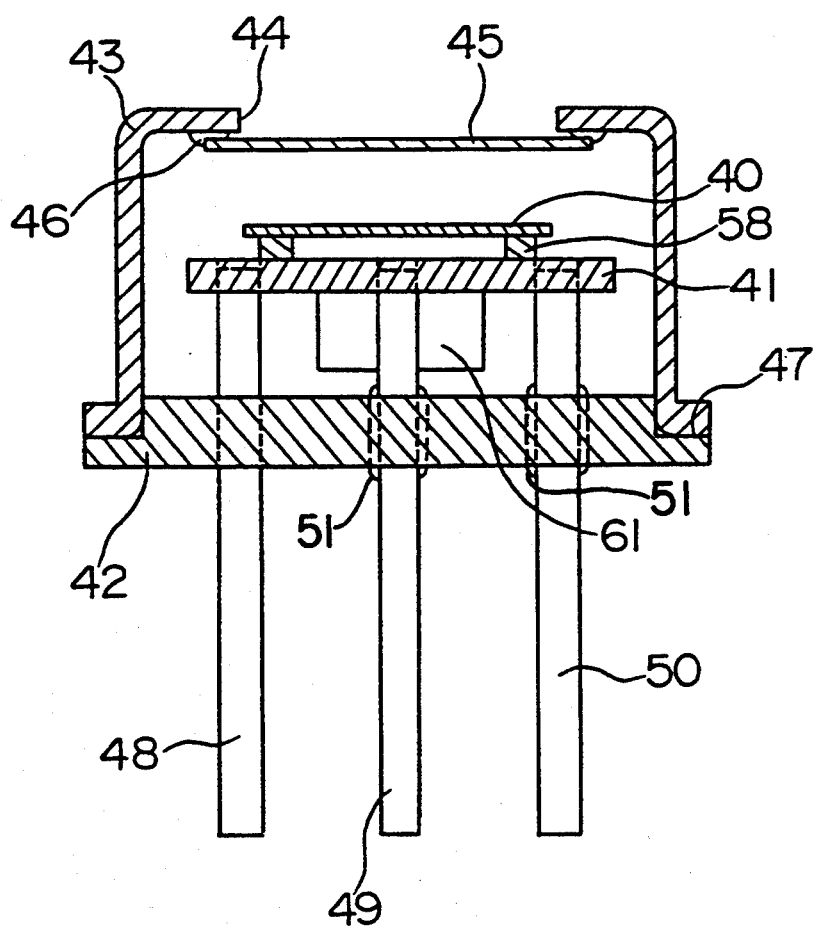
FIG. 6 is a longitudinal cross sectional view showing a conventional pyroelectric device.
Figure 7:
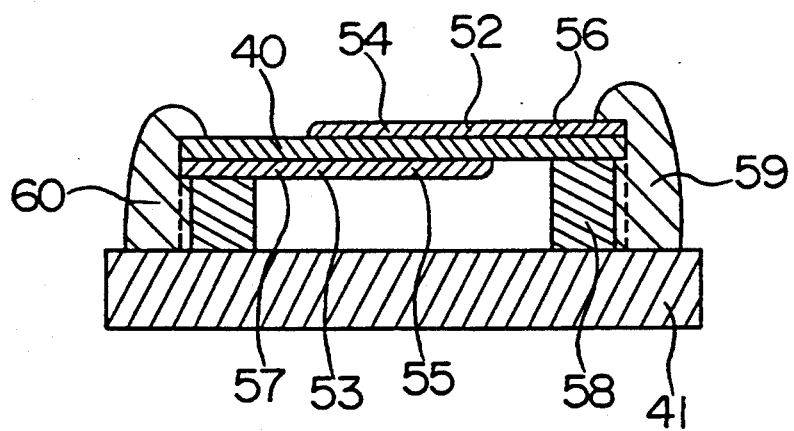
FIG. 7 is a longitudinal cross sectional view schematically showing a portion of FIG. 6.

Further, as another method, in the first layer formation, a keyhole-shaped layer may be formed by using nickel chromium alloy and thereafter platinum may be laminated only on the projecting portion of the keyhole shape, as shown in FIG. 5. Thus, finally it suffices that nickel chromium alloy is disposed on the light receiving surface of the pyroelectric member 11 and platinum is disposed on the surface, joined to the electrically conductive adhesives 26 and 27.

The operation of the pyroelectric device will now be described. The pyroelectric member 11 detects infrared rays passing through the filter 2, converts the same to an electric signal, and outputs the electric signal. The electric signal is applied to the gate of an unillustrated FET mounted on the printed board 15 to be amplified so that the signal is quantitatively detected as an amount of electricity proportional to an amount of the infrared rays. The pyroelectric member 11 may be composed of PZT (lead zirconate titanate), tantalic acid lithium, titanate, PVDF (polyvinylidene fluoride), the copolymer thereof, or the like.

As described above, since the surface of the can 4 and the stem 5 constituting the casing is coated with the surface treatment film 9 composed of the gold or nickel plated layer, the surface of the pyroelectric device does not become rusted and lose its weather resistance even under severe environmental conditions such as high humidity, and thus a practically applicable pyroelectric device can be obtained. Further, since the can 4 and the stem 5 constituting the casing are composed of Kovar having a thermal expansion coefficient fairly near to that of the filter 2, strain, which results from the difference of thermal expansion coefficients due to a thermal variation, is not caused at the junction between the can 4 and the stem 5 composed of the same material nor at the junction between the can 4 and the filter 2 attached to the can 4. Therefore, no gap is generated at the junction between the different materials and no crack is made in the filter 2 even under severe environmental conditions. Thus, a practically applicable device capable of maintaining an airtightness for a long time can be obtained.

In addition to the above arrangement, the filter 2 is strongly fixed to the window hole 1 of the can 4 in such a manner that the fusing agent 3 such as silver solder or the like is placed along the circumference of the window hole 1, melted and then solidified. As a result, the window hole 1 can be completely sealed so that corrosion of the pyroelectric member 11 and the like caused by the penetration of the air from outside can be prevented. Further, since the joint strength of the respective portions is improved as described above, the inside A of the frame member can be placed under a reduced pressure (vacuum) state, by which the effect of remaining gas can be removed, if it remains within the frame member.

Further, since the terminal pins 6, 7 and 8 extending from the stem 5 are arranged as the kneel pins each having the collar 17 radially projecting at the extreme ends thereof on the inner side of the casing, the printed board 15 can be readily mounted in such a manner that the extreme ends 18 of the terminal pins axially extending from the collars 17 are inserted into the pin holes 19 formed in the printed board 15 and the lower surface of the printed board 15 is received by the collars 17. Thus, the pyroelectric member 11 mounted on the printed board and in parallel therewith can be disposed in parallel with the filter 2. With this arrangement, an effect can be obtained in that workability in production is improved and a pyroelectric device with high accuracy in construction and performance is provided.

Finally, since the absorbing electrode portions of the electrodes formed on the upper and lower surfaces of the pyroelectric member 11 have a thickness or material different from those of the drawing electrode portions, an effect can be obtained in that a corrosion resistive pyroelectric device excellent in durability is obtained.

I claim:

1. A pyroelectric device comprising:
   a stem;
   a printed board mounted on said stem;
   an element base mounted on said printed board;
   a pyroelectric member mounted on said element base for detecting infrared rays;
   a can having a window hole formed therein and being fixed to said stem in an airtight manner;
   a filter mounted to said can and sealingly covering said window hole;
   an upper electrode formed on an upper surface of said pyroelectric member;
   a lower electrode formed on a lower surface of said pyroelectric member;
   wherein said printed board has an electric circuit for outputting an electric signal corresponding to the infrared rays detected by said pyroelectric member;
   wherein each of said upper and lower electrodes includes an absorbing electrode portion composed of an infrared ray absorbing material formed as a thin layer, and a drawing electrode portion connected at a first end thereof with said absorbing electrode portion and being formed as a layer thicker than said thin layer of said absorbing electrode portion, a second end of said drawing electrode portion of each of said upper and lower electrodes being disposed at an outer edge of said pyroelectric member; and
   wherein electrically conductive adhesive portions are provided outside said element base between said printed board and a second end of said drawing electrode portion of each of said upper and lower electrodes to electrically connect said printed board with each of said upper and lower electrodes.

2. A pyroelectric device comprising:
a stem;
a printed board mounted on said stem;
an element base mounted on said printed board;
a pyroelectric member mounted on said element base for detecting infrared rays;
a can having a window hole formed therein and being fixed to said stem in an airtight manner;
a filter mounted to said can and sealingly covering said window hole;
an upper electrode formed on an upper surface of said pyroelectric member;
a lower electrode formed on a lower surface of said pyroelectric member;
wherein said printed board has an electric circuit for outputting an electric signal corresponding to the infrared rays detected by said pyroelectric member;
wherein each of said upper and lower electrodes includes an absorbing electrode portion composed of an infrared ray absorbing material, and a drawing electrode portion connected at a first end thereof with said absorbing electrode portion and being composed of a corrosion resistive material, a second end of said drawing electrode portion of each of said upper and lower electrodes being disposed at an outer edge of said pyroelectric member; and
wherein electrically conductive adhesive portions are provided outside said element base between said printed board and a second end of said drawing electrode portion of each of said upper and lower electrodes to electrically connect said printed board with each of said upper and lower electrodes.

3. A pyroelectric device comprising:
a stem;
a printed board mounted on said stem;
a pyroelectric member mounted to said printed board for detecting infrared rays;
a can having a window hole formed therein and being fixed to said stem in an airtight manner;
an upper electrode formed on an upper surface of said pyroelectric member;
a lower electrode formed on a lower surface of said pyroelectric member;
a filter fixed to said can about a circumference of said window hole by a solder for sealing said window hole; and
wherein said printed board has an electric circuit for outputting an electric signal corresponding to the infrared rays detected by said pyroelectric member.

4. A pyroelectric device as recited in claim 3, wherein said solder is interposed between an upper surface of said filter and a lower surface of a top wall of said can.

* * * * *